US008188723B2

(12) United States Patent
Piselli et al.

(10) Patent No.: US 8,188,723 B2
(45) Date of Patent: May 29, 2012

(54) SWITCHING CONVERTER AND METHOD TO CONTROL A SWITCHING CONVERTER

(75) Inventors: Marco Piselli, Padua (IT); Cristian Garbossa, Bressanone (IT); Andrea Vecchiato, Mirano (IT); Emanuele Bodano, Padua (IT); Andrea Morra, Salzano (IT); Simone Massaro, Venice (IT); Maurizio Inversi, Padua (IT)

(73) Assignee: Infineon Technologies AG, Neubiberg (DE)

( * ) Notice: Subject to any disclaimer, the term of this patent is extended or adjusted under 35 U.S.C. 154(b) by 604 days.

(21) Appl. No.: 12/358,057

(22) Filed: Jan. 22, 2009

(65) Prior Publication Data

US 2010/0181975 A1     Jul. 22, 2010

(51) Int. Cl.
G05F 1/40     (2006.01)
(52) U.S. Cl. .................................. 323/285; 323/299
(58) Field of Classification Search .................. 323/222, 323/272, 276, 273, 282–290, 351; 363/49, 363/50, 56.02, 65, 95–98
See application file for complete search history.

(56) References Cited

U.S. PATENT DOCUMENTS

| 4,823,070 | A  | * | 4/1989  | Nelson ............................ 323/285 |
| 6,476,589 | B2 | * | 11/2002 | Umminger et al. ............ 323/282 |
| 6,552,517 | B1 | * | 4/2003  | Ribellino et al. .............. 323/282 |
| 6,683,441 | B2 | * | 1/2004  | Schiff et al. .................... 323/222 |
| 7,045,992 | B1 | * | 5/2006  | Silva et al. ..................... 323/222 |

OTHER PUBLICATIONS

"Step Down Voltage Regulator with Reset," TLE 6365, Data Sheet, Jul. 30, 2007, Rev. 1.9, 18 pages, Infineon Technologies AG, Munich, Germany.
Erickson, R.W., et al., "Controller Design," Fundamentals of Power Electronics, $2^{nd}$ Ed., Chapter 9, Jan. 2001, pp. 331-369.

* cited by examiner

*Primary Examiner* — Rajnikant Patel
(74) *Attorney, Agent, or Firm* — Slater & Matsil, L.L.P.

(57) ABSTRACT

Preferred embodiments of the present invention are a switching converter, an integrated circuit package, and method for controlling a switching converter. An embodiment of the invention is a switching converter comprising a first compensation network having a first node coupled to an error voltage and a second node coupled to electrical ground and a second compensation network having an input coupled to the error voltage. A frequency domain transfer function of the first compensation network comprises a first zero and a plurality of first poles, and a frequency domain transfer function of the second compensation network comprises a second zero and a second pole.

27 Claims, 11 Drawing Sheets

US 8,188,723 B2

SWITCHING CONVERTER AND METHOD TO CONTROL A SWITCHING CONVERTER

TECHNICAL FIELD

The present invention relates generally to a switching converter and method to control a switching converter.

BACKGROUND

Switching converters are widely used in the power supply field because of their high conversion efficiency. Yet, a switching converter has a phase margin that generally should be compensated, and the output capacitor and associated equivalent series resistor (ESR) of a converter generally create a zero in the transfer function of the converter's system that can lead to instability. To correct these problems, controllers may compensate a loop system with additional components that boost the phase margin and prevent the instability that could be created.

Generally, a controller for a switching converter is designed and manufactured in a single package. Such a controller may include an op-amp and a pulse-width modulator (PWM). As with any package, the number of pins on the package impacts the cost of the device. A lower number of pins generally will reduce the cost of the device.

Ideally, the controller would have fixed compensation for the switching converter so no additional circuitry would be needed off the package, and the need for pins to accommodate the compensation circuit would be eliminated. The disadvantage to this approach is inflexibility in allowing for various values of the output capacitor and ESR. Generally, if the output capacitor and ESR create a zero with a frequency less than the unity gain frequency, the system will become instable.

Also, the controller package could allow for compensation circuitry off the package so that a circuit designer would be able to consider a known value of the output capacitor and ESR when creating the compensation network. One disadvantage of conventional methods using this approach is that at least two pins on a package are generally required for the compensation network. The increased pins generally increase cost of the package.

SUMMARY OF THE INVENTION

There is a need for a controller for a switching converter that allows for compensation of a switching converter loop to provide a high phase margin over any ESR or output capacitor value using only one pin of the controller package. These and other problems are generally solved or circumvented, and technical advantages are generally achieved, by embodiments of the present invention.

An embodiment of the present invention is a switching converter comprising a first compensation network having a first node coupled to an error voltage and a second node coupled to electrical ground and a second compensation network having an input coupled to the error voltage. A frequency domain transfer function of the first compensation network comprises a first zero and a plurality of first poles, and a frequency domain transfer function of the second compensation network comprises a second zero and a second pole.

Another embodiment of the present invention is a switching converter comprising a first compensation network having a first node coupled to an error voltage and a second node coupled to electrical ground comprising a first resistor and a first capacitor coupled in series between the error voltage and the electrical ground and a second capacitor coupled between the error voltage and the electrical ground. The switching converter further comprises a second compensation network having an input coupled to the error voltage.

Another embodiment of the present invention is an integrated circuit package comprising a plurality of external connections disposed on a package body, an error voltage output coupled to one of the external connections for external compensation of a switching converter between the one of the external connections and electrical ground, and a fixed filter disposed within the package body. The external compensation has a frequency domain transfer function that comprises a pole with a frequency that is substantially equal to a frequency of a zero caused by an output capacitor and equivalent series resistor of the switching converter.

In accordance with the present invention, a further embodiment is a method for controlling a switching converter comprising filtering an error signal with a compensation network coupled between the error signal and an electrical ground and filtering the error signal with a fixed filter to generate a compensation voltage output. A frequency domain transfer function of the compensation network comprises a first zero and a plurality of first poles, and a frequency domain transfer function of the fixed filter comprises a second zero and a second pole.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
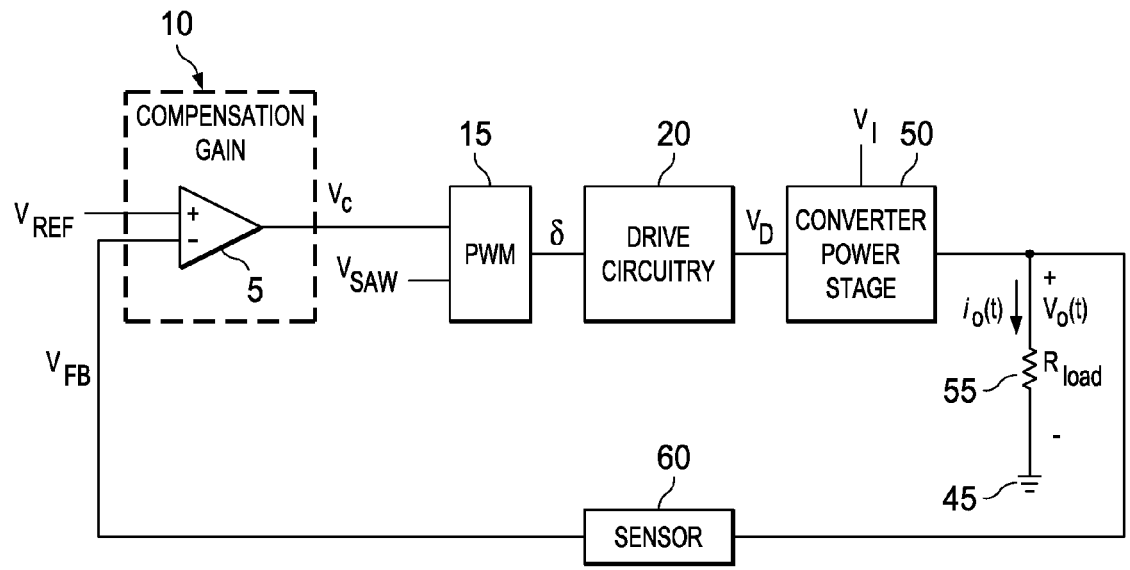
FIG. 1 is a general system for controlling a switching converter.

FIG. 1 generally shows a system for controlling a switching converter. A reference voltage $V_{ref}$ is input into the non-inverting terminal of an operational amplifier (op-amp) 5. A feedback voltage $V_{FB}$ is input into the inverting terminal of the op-amp 5. Compensation circuitry may be added with the op-amp 5 within the boxed line to create a compensation gain network 10. A compensation voltage $V_c$ from the op-amp 5 is input into a pulse-width modulator (PWM) 15. A sawtooth signal $V_{SAW}$ is also input into the PWM 15. The PWM 15 creates a signal with a duty cycle $\delta$ that is input into drive circuitry 20. The drive circuitry 20 outputs the drive voltage $V_D$ input into a converter power stage 50. The converter power stage 50 also has a voltage input $V_I$. The converter power stage 50 outputs an output voltage $v_o(t)$. The output current $i_o(t)$ is the current running to ground 45 through the load resistor 55, and the output voltage $v_o(t)$ is the voltage drop over the load resistor 55. The output voltage is fed back through a sensor 60. The output of the sensor 60 is the feedback voltage $V_{FB}$ input into the inverting terminal of the op-amp 5.

Figure 2:
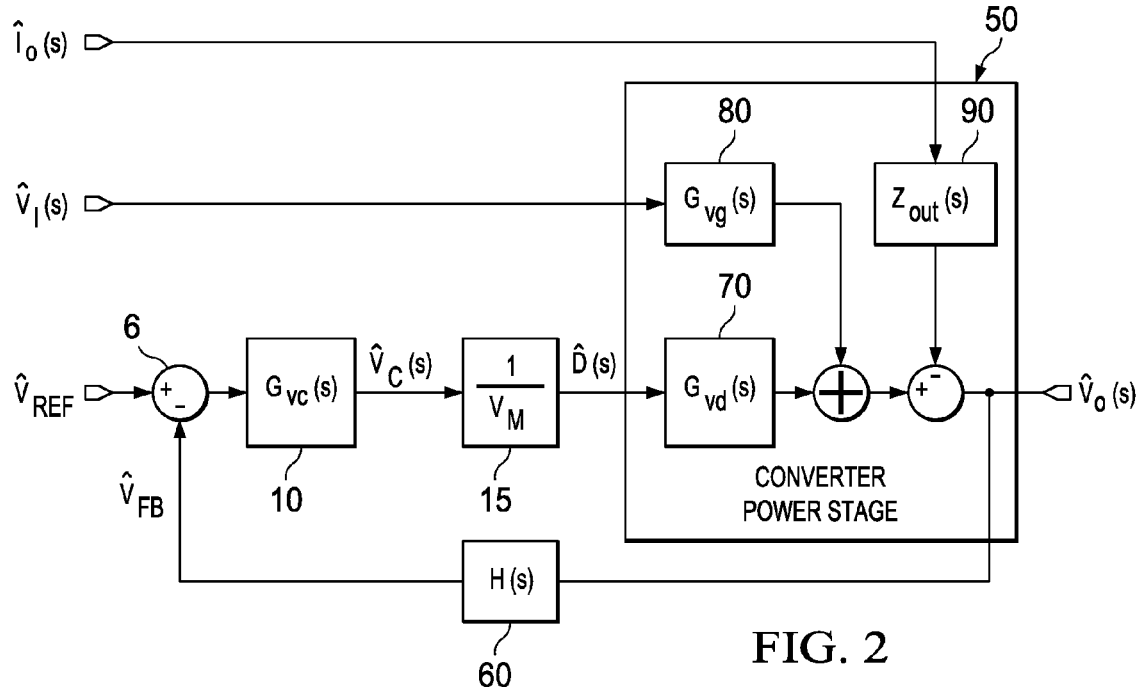
FIG. 2 illustrates a small signal representation of the system shown in FIG. 1.

FIG. 2 illustrates the small signal representation of the system shown in FIG. 1. The different components in FIG. 1 have different frequency domain transfer functions shown in FIG. 2. The compensation gain network 10 has a transfer function of $G_{vc}(s)$; the PWM 15 has a gain of $$\frac{1}{V_M};$$

and the sensor 60 has a transfer function of $H(s)$. Within the converter power stage 50 is a representation of the converter circuitry in the frequency domain. A converter loop transfer function $G_{vd}(s)$ 70 represents the frequency response to variations in the input duty cycle $\hat{D}(s)$. A voltage input transfer function $G_{vg}(s)$ 80 represents the frequency response to variations in the input voltage $\hat{V}_I(s)$. Likewise, $Z_{out}(s)$ 90 represents the frequency response of the switch circuitry to variations in the output current $\hat{I}_o(s)$. The responses from $G_{vd}(s)$ 70 and $G_{vg}(s)$ 80 are added together. From this, the response from $Z_{out}(s)$ 90 is subtracted.

A designer using a switching converter and the control circuitry illustrated in FIGS. 1 and 2 generally has freedom to create poles and zeros in the compensation gain network 10 transfer function $G_{vc}(s)$ and in the sensor 60 transfer function $H(s)$. All other parameters are generally intrinsic to the converter and generally are not altered by the designer.

The open-loop transfer function $T(s)$ is described by Eq. 1 below.

$$T(s) = G_{vc}(s) \frac{1}{V_M} G_{vd}(s) H(s) \quad \text{(Eq. 1)}$$

The uncompensated open-loop transfer function $T_u(s)$ is described by Eq. 2 below.

$$T_u(s) = \frac{1}{V_M} G_{vd}(s) \quad \text{(Eq. 2)}$$

where $G_{vc}(s)=1$ and $H(s)=1$.

FIGS. 3A through 6C illustrate exemplary switching converters and their frequency responses. The circuits for each converter generally are connected to the system in FIG. 1 within the converter power stage 50. The inputs and output of the converter power stage 50 are illustrated in each circuit. The general converter loop transfer function $G_{vd}(s)$ is described for each converter. This function may be substituted into Eq. 2 above to describe the uncompensated open-loop response as illustrated in the following bode plots. Further bode plots show the frequency response of the system when the system compensates each converter.

Figure 3A:
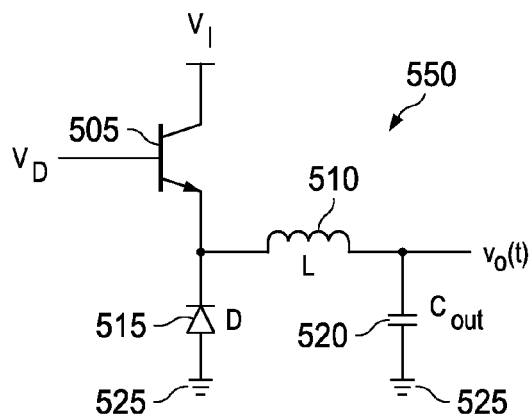
FIG. 3A is a buck converter circuit.

FIG. 3A shows a buck converter 550. The drive voltage $V_D$ is input to the base of an NPN bipolar power transistor 505. The collector is coupled to the voltage input $V_I$. The emitter is coupled to an inductor 510 and the cathode of a diode 515. The transistor may alternatively be a MOSFET with the gate connected to the drive voltage $V_D$, one source/drain coupled to the voltage input $V_I$, and the other source/drain coupled to the inductor 510 and the diode 515. Transistors may be exchanged as appropriate for any of the following circuits. The anode of the diode 515 is connected to ground 525. The other connection of the inductor 510 is connected to an output capacitor 520. The impedance of the output capacitor 520 also comprises an equivalent series resistor (ESR) (not illustrated). The potential node between the inductor 510 and the output capacitor 520 is the output voltage $v_o(t)$. The output capacitor 520 is also connected to ground 525.

The buck converter loop transfer function $G_{vd}(s)$ is generally described by Eq. 3 below.

$$G_{vd}(s) = V_I \frac{1 + \frac{s}{2\pi f_z}}{1 + \frac{s}{2\pi f_0 Q} + \left(\frac{s}{2\pi f_0}\right)^2} \quad \text{(Eq. 3)}$$

where $$f_0 = \frac{1}{2\pi \sqrt{LC_{out}}}; Q = R_{load} \sqrt{\frac{C_{out}}{L}};$$

and $$f_z = \frac{1}{2\pi R_{ESR} C_{out}}.$$

The uncompensated open-loop transfer function has a zero at frequency $f_z$ that is dependent on the ESR and the output capacitor 520.

Figure 3B:
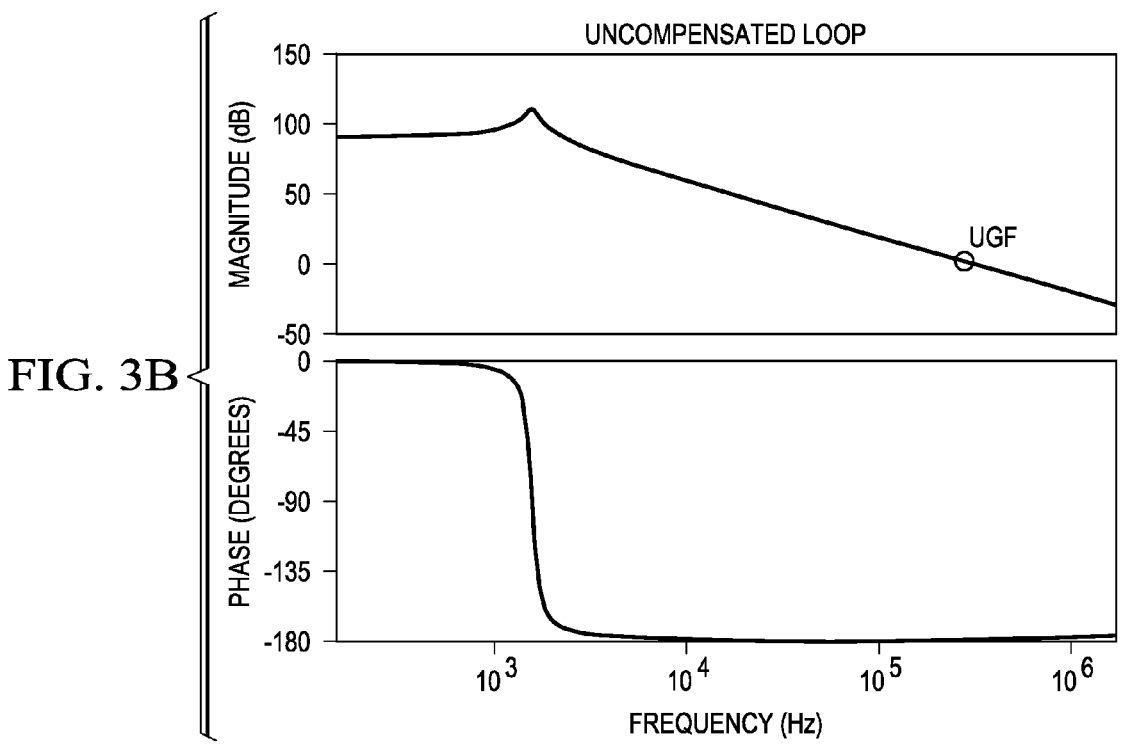
FIG. 3B is an exemplary bode plot for an uncompensated open-loop transfer function of a buck converter.

FIG. 3B is an example of a bode plot for the uncompensated open-loop transfer function when the ESR is a very low value. From this plot, it can be seen that the unity gain frequency (UGF) is too high, approximately $2.5 \times 10^5$ Hz, and the loop should be compensated.

Figure 3C:
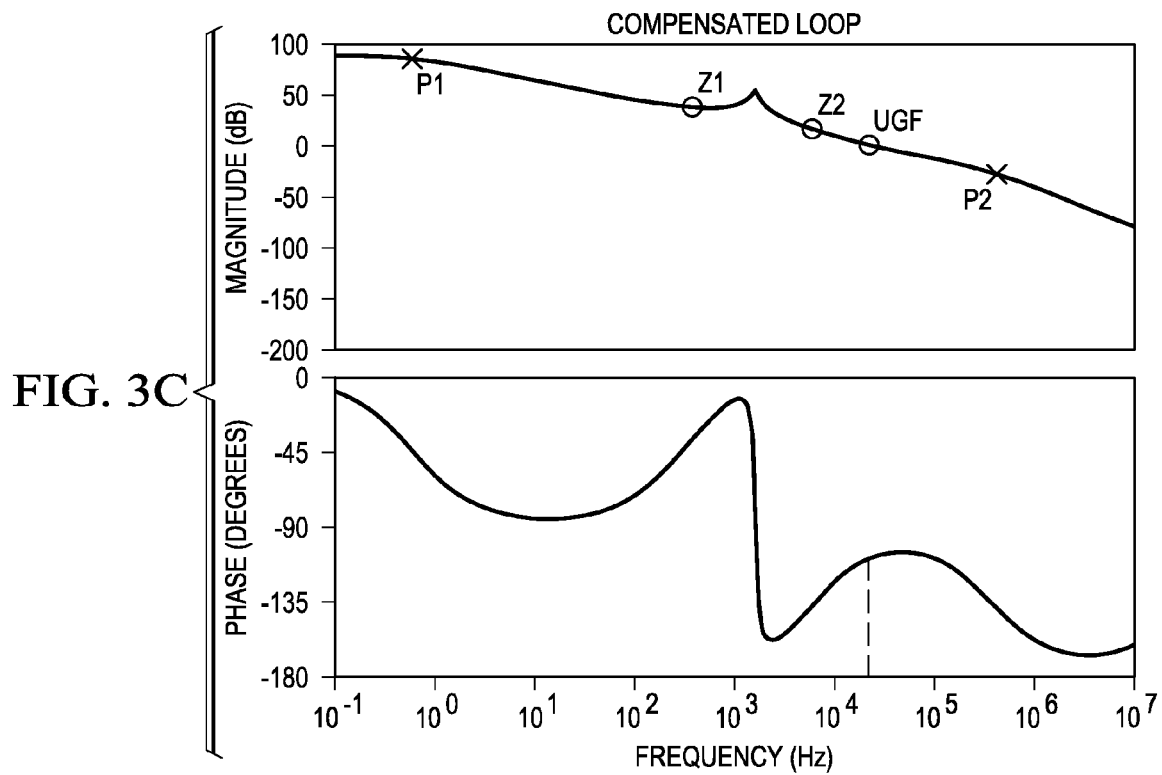
FIG. 3C is an exemplary bode plot for a compensated open-loop transfer function of a buck converter.

Typically, the loop is compensated by adding a low frequency pole and zero and a high frequency zero and pole. FIG. 3C is an example of a bode plot that results from this compensation. The low frequency pole P1 reduces the bandwidth, and the low frequency zero Z1 boosts the phase. The high frequency zero Z2 added just before the UGF causes a −20 dB/decade slope in the magnitude plot, and the high frequency pole P2 avoids any unwanted crossing after the UGF due to higher frequency zeros. After this compensation, the UGF is much lower, approximately $2 \times 10^4$ Hz.

If, on the other hand, the ESR is a high value, an additional zero will be present in the compensated loop that will cause instability. In such a situation, the high frequency zero should be eliminated or the high frequency zero and pole should be reduced.

Figure 4A:
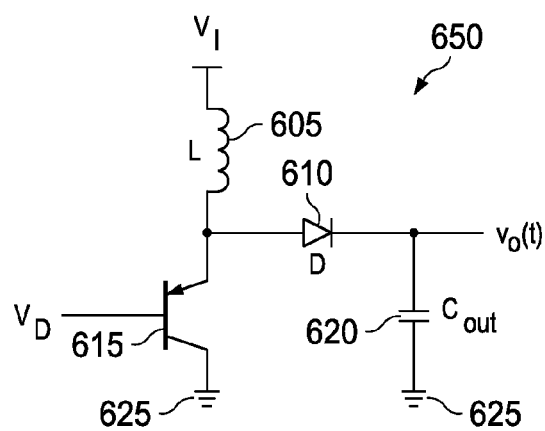
FIG. 4A is a boost converter circuit.

FIG. 4A shows a boost converter 650. The drive voltage is input to the base of a PNP bipolar power transistor 615. The collector is coupled to ground 625. The emitter is coupled to an inductor 605 and the anode of a diode 610. The other connection to the inductor is coupled to the voltage input $V_I$. The cathode of the diode 610 is connected an output capacitor 620. The potential node between the diode 610 and the output capacitor 620 is the output voltage $v_o(t)$. The impedance of the output capacitor 620 also comprises an ESR (not illustrated). The output capacitor 620 is then connected to ground 625.

The boost converter loop transfer function $G_{vd}(s)$ is generally described by Eq. 4 below.

$$G_{vd}(s) = \frac{V_o^2}{V_I} \frac{\left(1 + \frac{s}{2\pi f_{LHP-z}}\right)\left(1 - \frac{s}{2\pi f_{RHP-z}}\right)}{1 + \frac{s}{2\pi f_0 Q} + \left(\frac{s}{2\pi f_0}\right)^2} \quad \text{(Eq. 4)}$$

where $$f_0 = \frac{V_I}{V_o} \frac{1}{2\pi \sqrt{LC_{out}}}; Q = \frac{V_I}{V_o} R_{load} \sqrt{\frac{C_{out}}{L}};$$

$$f_{RHP-z} = \left(\frac{V_I}{V_o}\right)^2 \frac{R_{load}}{2\pi L};$$

and $$f_{LHP-z} = \frac{1}{2\pi R_{ESR} C_{out}}.$$

The uncompensated open-loop transfer function has a zero at frequency $f_{LHP-z}$ that is dependent on the ESR and the output capacitor 620.

Figure 4B:
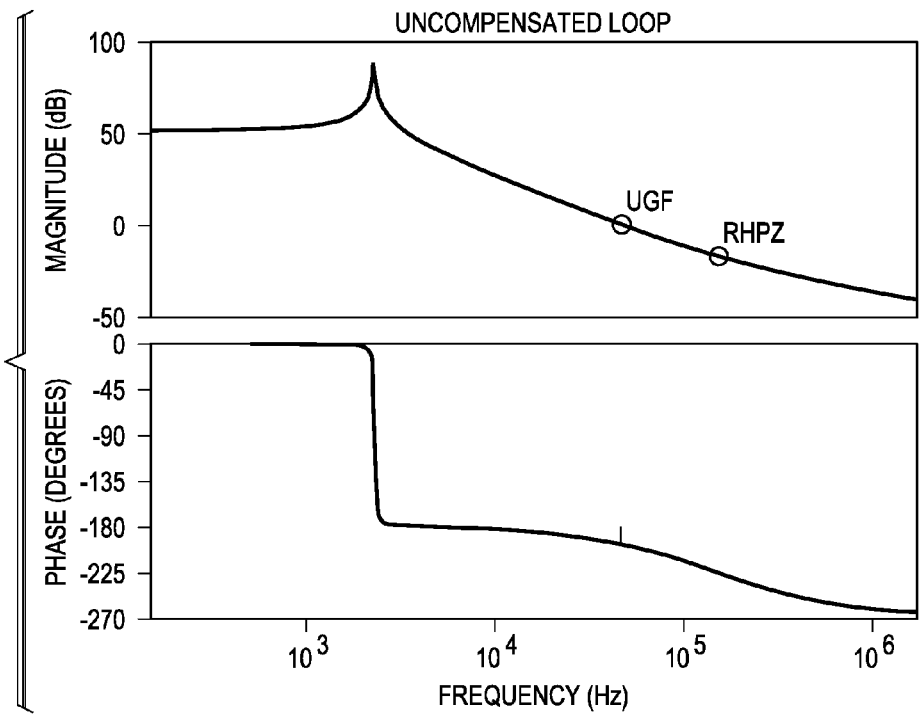
FIG. 4B is an exemplary bode plot for an uncompensated open-loop transfer function of a boost converter.

FIG. 4B is an example of a bode plot for the uncompensated open-loop transfer function when the ESR is a very low value. From this plot, it can be seen that the phase margin is negative, and the loop should be compensated.

Figure 4C:
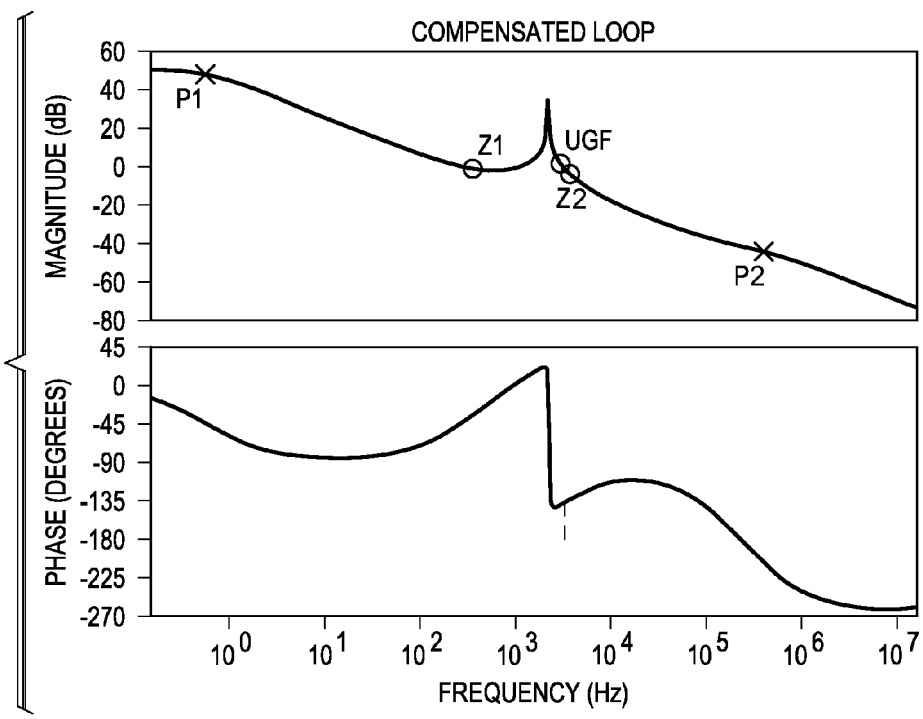
FIG. 4C is an exemplary bode plot for a compensated open-loop transfer function of a boost converter.

FIG. 4C is an example bode plot that results from compensating the loop. Generally, the loop is compensated by adding a low frequency pole and zero, adding a high frequency zero and pole, and setting the right half plane zero frequency $f_{RHP-z}$ much higher than the complex pole $f_0$ and the cutoff, or corner, frequency $f_c$. The low frequency pole P1 reduces the bandwidth, and the low frequency zero Z1 boosts the phase. The high frequency zero Z2 added just after the UGF causes a −20 dB/decade slope in the magnitude plot, and the high frequency pole P2, set at a frequency higher than or equal to the right half plane zero frequency $f_{RHP-z}$, avoids any unwanted crossing after the UGF due to higher frequency zeros. After this compensation, the phase margin is positive, approximately 42 degrees.

Again, if the ESR is a high value, an additional zero from the left half plane zero frequency $f_{LHP-z}$ will be present in the compensated loop that will cause instability. In such a situation, the high frequency zero should be eliminated or the high frequency zero and pole should be reduced.

Figure 5A:
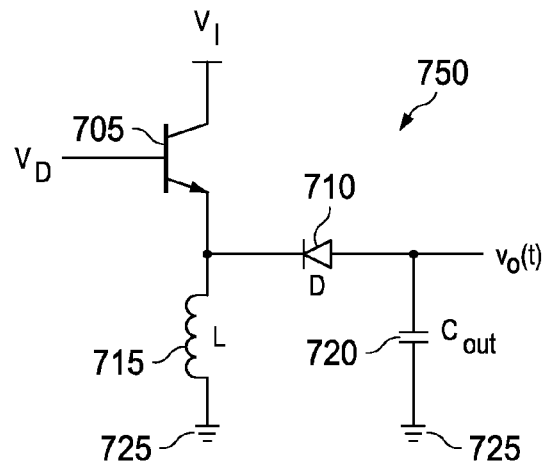
FIG. 5A is a buck-boost converter circuit.

FIG. 5A shows a buck-boost converter 750. The drive voltage $V_D$ is input to the base of a NPN bipolar power transistor 705. The voltage input $V_I$ is connected to the collector. The emitter is coupled to an inductor 715 and the cathode of a diode 710. The other connection to the inductor is coupled to ground 725. The anode of the diode 710 is connected an output capacitor 720. The potential node between the diode 710 and the output capacitor 720 is the output voltage $v_o(t)$. The impedance of the output capacitor 720 also comprises an ESR (not illustrated). The output capacitor 720 is then connected to ground 725.

The buck-boost converter loop transfer function $G_{vd}(s)$ is generally described by Eq. 5 below.

$$G_{vd}(s) = -\frac{(V_I + |V_o|)^2}{V_I} \frac{\left(1 + \frac{s}{2\pi f_{LHP-z}}\right)\left(1 - \frac{s}{2\pi f_{RHP-z}}\right)}{1 + \frac{s}{2\pi f_0 Q} + \left(\frac{s}{2\pi f_0}\right)^2} \quad \text{(Eq. 5)}$$

where $$f_0 = \frac{V_I}{|V_o| + V_I} \frac{1}{2\pi \sqrt{LC_{out}}}; Q = \frac{V_I}{V_I + |V_o|} R_{load} \sqrt{\frac{C_{out}}{L}};$$

$$f_{RHP-z} = \frac{V_I^2}{|V_o|(V_I + |V_o|)} \frac{R_{load}}{2\pi L};$$

and $$f_{LHP-z} = \frac{1}{2\pi R_{ESR} C_{out}}.$$

The uncompensated open-loop transfer function has a zero at frequency $f_{LHP-z}$ that is dependent on the ESR and the output capacitor 720.

Figure 5B:
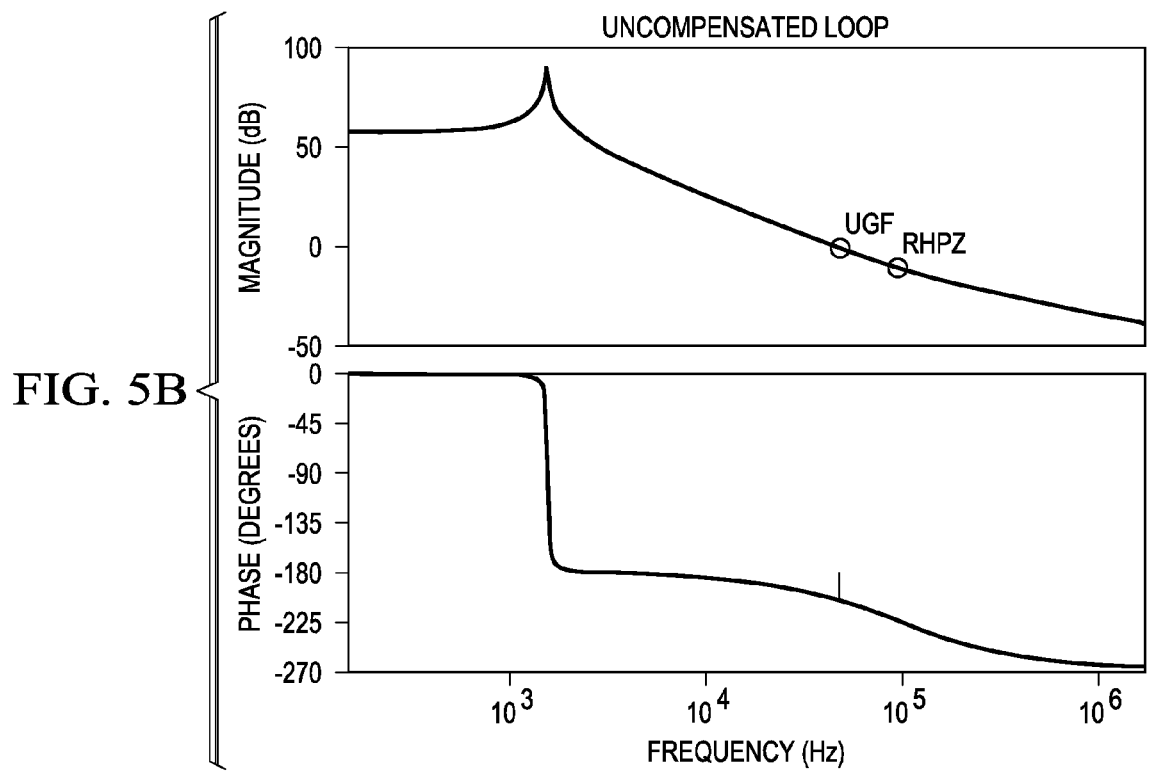
FIG. 5B is an exemplary bode plot for an uncompensated open-loop transfer function of a buck-boost converter.

FIG. 5B is an example of a bode plot for the uncompensated open-loop transfer function when the ESR is a very low value. Again, the phase margin is negative, and the loop must be compensated.

Figure 5C:
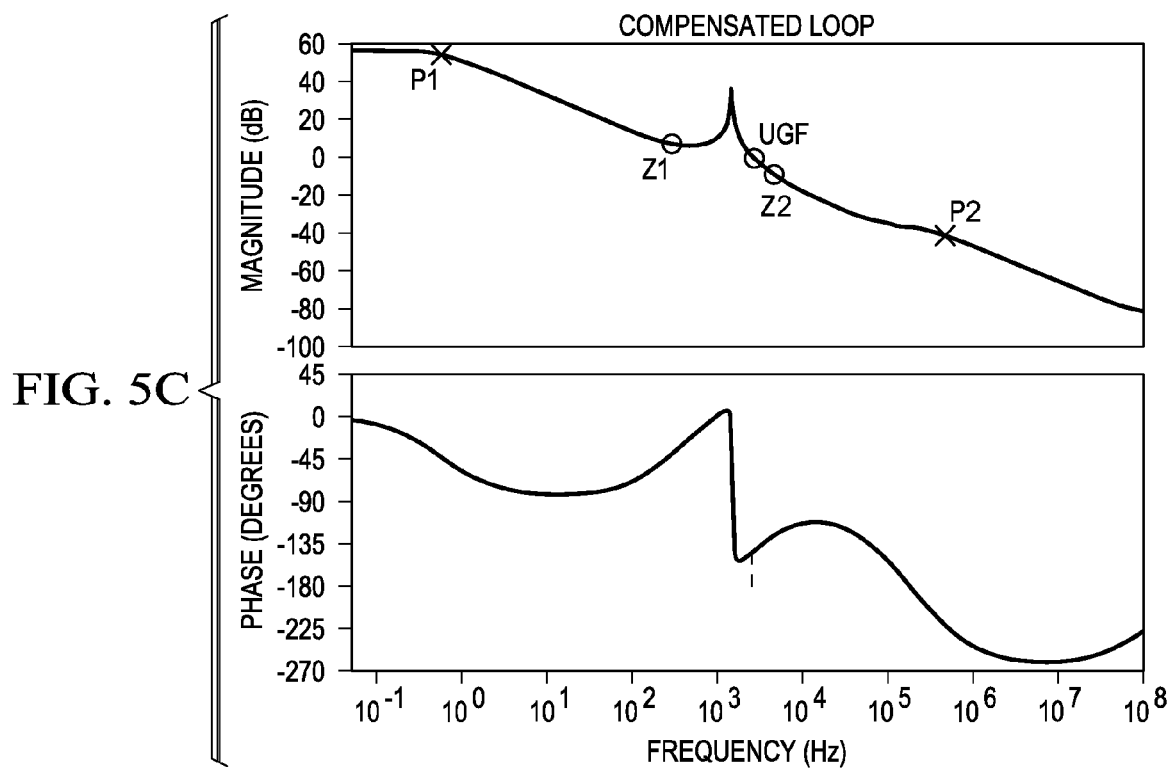
FIG. 5C is an exemplary bode plot for a compensated open-loop transfer function of a buck-boost converter.

FIG. 5C is an example bode plot that results from compensating the loop. Again, two sets of a pole and a zero are added to compensate the loop. After compensation, the phase margin is positive, approximately 26 degrees.

Figure 6A:
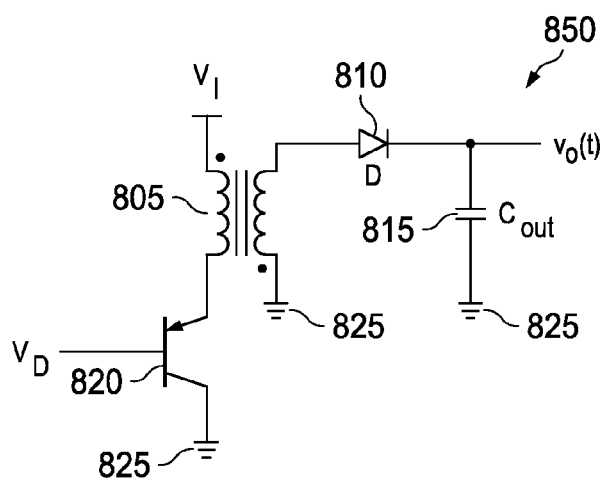
FIG. 6A is a flyback converter circuit.

FIG. 6A shows a flyback converter 850. The drive voltage $V_D$ is input to the base of a PNP bipolar power transistor 820. The collector is connected to ground 825. The emitter is coupled to the non-polarity connection of a primary winding of a transformer 805. The polarity connection of the primary winding of the transformer 805 is connected to the input voltage $V_I$. The polarity connection of a secondary winding of the transformer 805 is connected to ground 825. The non-polarity connection of the secondary winding of the transformer 805 is connected to the anode of a diode 810. The transformer 805 has a number of windings on the primary coil $N_P$ and a number of windings on the secondary coil $N_S$ such that $N_P:N_S=1:N$. The cathode of the diode 810 is connected an output capacitor 815. The potential node between the diode 810 and the output capacitor 815 is the output voltage $v_o(t)$. The impedance of the output capacitor 815 also comprises an ESR (not illustrated). The output capacitor 815 is then connected to ground 825.

The flyback converter loop transfer function $G_{vd}(s)$ is generally described by Eq. 6 below.

$$G_{vd}(s) = \frac{(NV_I + V_o)^2}{NV_I} \frac{\left(1 + \frac{s}{2\pi f_{LHP-z}}\right)\left(1 - \frac{s}{2\pi f_{RHP-z}}\right)}{1 + \frac{s}{2\pi f_0 Q} + \left(\frac{s}{2\pi f_0}\right)^2} \quad \text{(Eq. 6)}$$

where $$f_0 = \frac{NV_I}{V_o + NV_I} \frac{1}{2\pi\sqrt{L_S C_{out}}}; \quad Q = \frac{NV_I}{NV_I + V_o} R_{load} \sqrt{\frac{C_{out}}{L}};$$

$$f_{RHP-z} = \frac{(NV_I)^2}{V_o(NV_I + V_o)} \frac{R_{load}}{2\pi L_S};$$

and $$f_{LHP-z} = \frac{1}{2\pi R_{ESR} C_{out}}.$$

The uncompensated open-loop transfer function has a zero at frequency $f_{LHP-z}$ that is dependent on the ESR and the output capacitor 815.

Figure 6B:
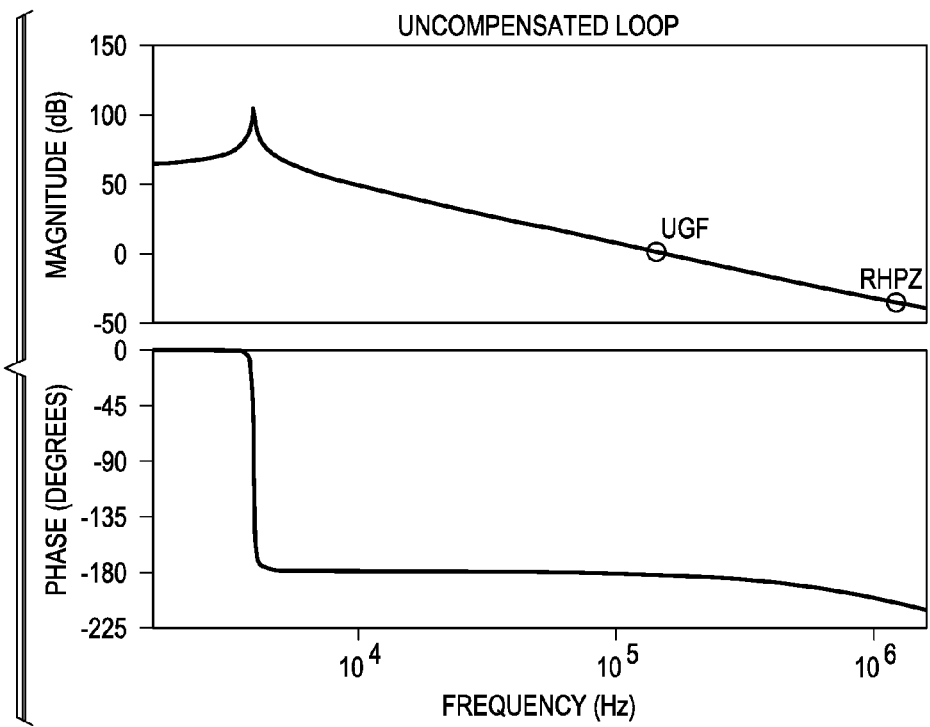
FIG. 6B is an exemplary bode plot for an uncompensated open-loop transfer function of a flyback converter.

FIG. 6B is an example of a bode plot for the uncompensated open-loop transfer function when the ESR is a very low value. Again, the phase margin is negative, and the loop must be compensated.

Figure 6C:
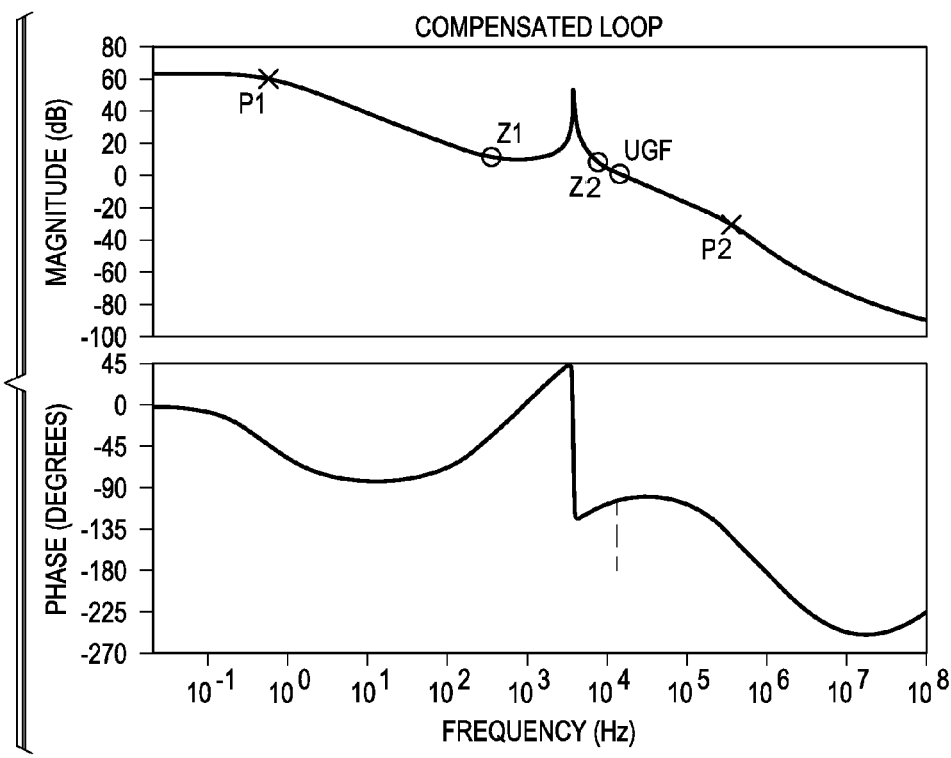
FIG. 6C is an exemplary bode plot for a compensated open-loop transfer function of a flyback converter.

FIG. 6C is an example bode plot that results from compensating the loop. Again, two sets of a pole and a zero are added to compensate the loop. After compensation, the phase margin is positive, approximately 74 degrees.

Figure 7:
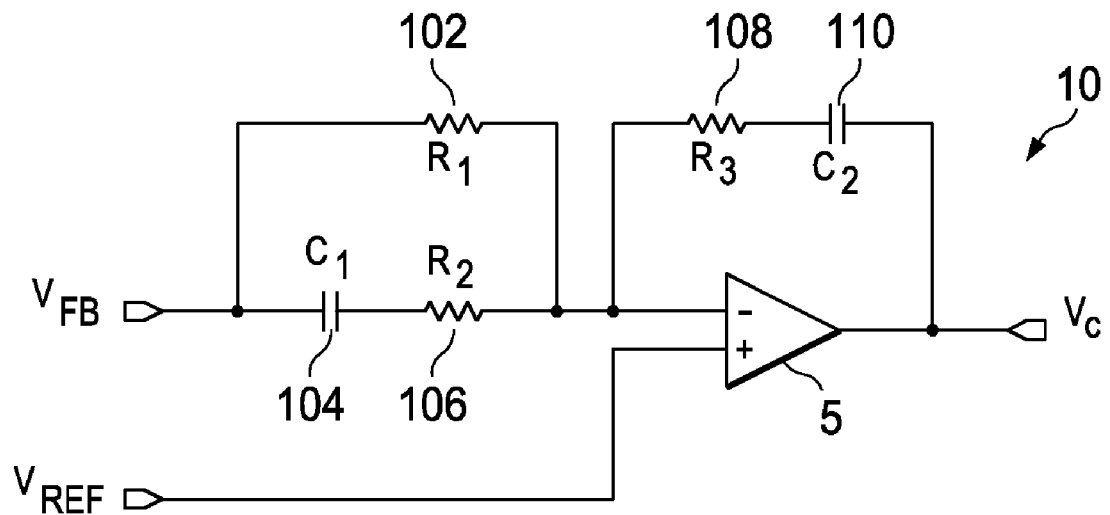
FIG. 7 is a first known method to compensate a loop system.
Figure 8A:
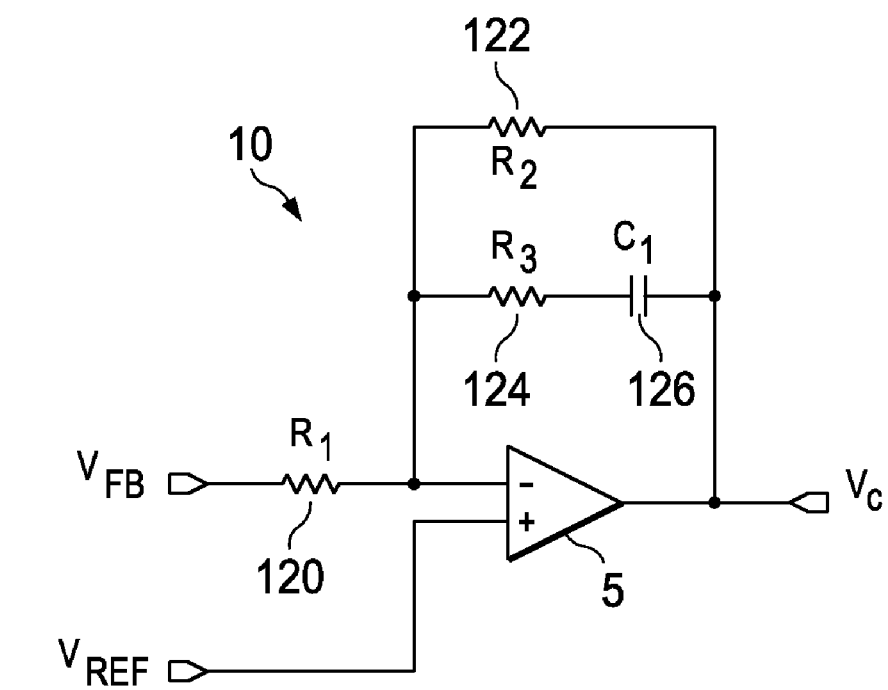
FIG. 8A is a second known method to compensate a loop system.
Figure 8B:
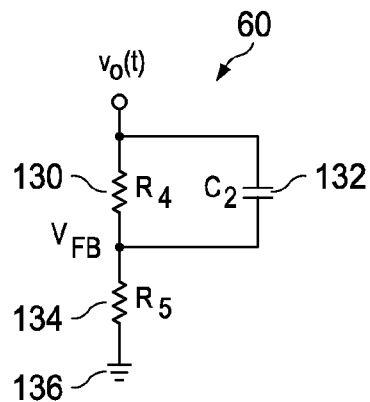
FIG. 8B is a second known method to compensate a loop system.

FIGS. 7 through 8B show known circuits to compensate the converters. Each circuit generally has a frequency response that adds two pole and zero pairs to the loop transfer function T(s).

FIG. 7 illustrates a conventional circuit to compensate the loop. In the compensation gain network 10, the feedback voltage $V_{FB}$ is input into a first resistor 102 that is in parallel with a series first capacitor 104 and second resistor 106. The node on the opposite side of these elements from the input feedback voltage $V_{FB}$ is input into the inverting input of the op-amp 5. The inverting input of the op-amp 5 is also coupled to a third resistor 108. The third resistor 108 is in series with a second capacitor 110 that is connected to the output of the op-amp 5. The output of the op-amp 5 is also the compensation voltage $V_c$.

The transfer function of this network is described below by Eq. 7.

$$G_{vc}(s) = -\frac{1}{sR_1 C_2} \cdot \frac{(1 + sR_3 C_2)(1 + s(R_1 + R_2)C_2)}{1 + sR_2 C_1} \quad \text{(Eq. 7)}$$

Using this circuit, two poles and two zeros are added into the loop. The resistors and capacitors generally are external to any controller package and are added by a circuit designer who may know the values of the output capacitor and ESR such that the compensation may be adjusted to accommodate the output capacitor and ESR.

This method is flexible but generally requires at least two pins on a controller package. The compensation gain network 10 is in series with the loop. Because of this, any circuitry added to the network for compensation would necessarily be in series with the loop and require at least two pins on a package to be effectuated.

FIGS. 8A and 8B show other known circuits that combine to compensate the loop. FIG. 8A represents the circuitry of the compensation gain network 10. The feedback voltage $V_{FB}$ is input into a first resistor 120 that is connected to the inverting input of the op-amp 5. The inverting input of the op-amp 5 is coupled to a second resistor 122 that is in parallel with a series third resistor 124 and first capacitor 126. The parallel elements are connected to the output of the op-amp 5 that is also the compensation voltage $V_c$.

FIG. 8B is the sensor 60. The system output voltage $v_o(t)$ is fed back into a parallel fourth resistor 130 and second capacitor 132. These are connected to a potential node that is the feedback voltage $V_{FB}$. This node is connected to a fifth resistor 134 that is coupled to ground 136.

The transfer function of the compensation gain network in FIG. 8A is described below by Eq. 8.

$$G_{vc}(s) = -\frac{R_2}{R_1} \cdot \frac{(1 + sR_3 C_1)}{1 + s(R_2 + R_3)C_1} \quad \text{(Eq. 8)}$$

The transfer function of the sensor in FIG. 8B is described below by Eq. 9.

$$H(s) = \frac{R_5}{R_4 + R_5} \cdot \frac{1 + sR_4 C_2}{1 + s\frac{R_4 R_5}{R_4 + R_5} C_2} \quad \text{(Eq. 9)}$$

By inserting these transfer functions into Eq. 1, the loop transfer function T(s) is compensated by adding a zero and a pole from the compensation gain network 10 transfer function $G_{vc}(s)$ and by adding a zero and a pole from the sensor 60 transfer function H(s).

The flexibility of the system comes from the ability of the circuit designer to create the high frequency pole and zero in the sensor 60 once the designer knows the values of the output capacitor and ESR. Generally, the low frequency pole and zero are fixed internally to the package within the compensation gain network 10. The designer then has the ability to design the sensor 60 externally to the package to introduce the high frequency zero and pole so the ESR and output capacitor will not create instability.

The disadvantages of this method are that system compensation generally depends on the feedback ratio of the feedback voltage $V_{FB}$ to the output voltage $v_o(t)$ and that the system generally only works if the fourth resistor 130 is substantially greater than the fifth resistor 134. If the output voltage $v_o(t)$ goes to the feedback voltage $V_{FB}$, i.e., $v_o(t) \rightarrow V_{FB}$, then this implies from Eq. 9 that the fourth resistor 130 is substantially less than the fifth resistor 134. Further, when the fourth resistor 130 is substantially less than the fifth resistor 134, the frequency of the zero in Eq. 9 will cancel out the pole. Thus, no phase boost or compensation is possible.

Figure 9:
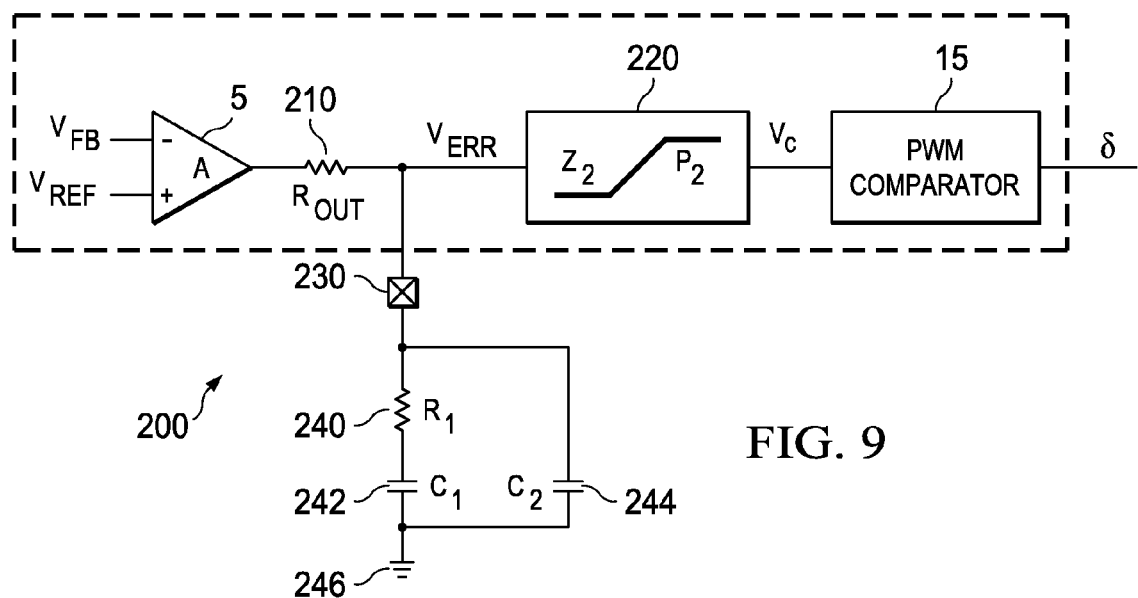
FIG. 9 is a general embodiment to control a switching converter.

FIG. 9 shows a general embodiment wherein the dashed line represents a package 200 for a controller. The package 200 includes the op-amp 5 and the PWM 15 shown in FIG. 1. The op-amp 5 has an internal gain A. The output of the op-amp 5 is connected to an output resistor 210. The output resistor 210 is then connected to a fixed compensation filter 220 $G_{vc2}(s)$. Between the output resistor 210 and the fixed compensation filter 220 is a potential node $V_{ERR}$. This potential node $V_{ERR}$ is connected to a package pin 230 to be connected to a variable network to cancel out the ESR and output capacitor zero and to add the low frequency pole and zero. The package pin 230 is coupled to a first resistor 240 and a second capacitor 244. The first resistor 240 is in series with a first capacitor 242. The series first resistor 240 and first capacitor 242 is parallel to the second capacitor 244. The first capacitor 242 and the second capacitor 244 are connected to ground 246.

For simplicity, the fixed compensation filter 220 is the second part of the compensation gain network with a transfer function $G_{vc2}(s)$, and the op-amp 5, output resistor 210, and variable network create the first part of the compensation gain network with a transfer function $G_{vc1}(s)$. The two are formed such that $G_{vc}(s)=G_{vc1}(s)G_{vc2}(s)$.

The fixed compensation filter 220 $G_{vc2}(s)$ is internal to the package. It introduces the high frequency zero and pole at fixed frequencies. The filter is in series with the loop, but because it is fixed internally to the package, it requires no circuitry external to the package.

The variable network allows a circuit designer to introduce a pole to cancel out a zero introduced from the output capacitor and ESR and to add a low frequency pole and zero. By creating a controller in this way, only a single pin is used on the package 200 to compensate the loop. It also leaves a circuit designer the flexibility to use the package for any value of output capacitor and ESR by having a means to cancel the zero created by the output capacitor and ESR.

The first part of the compensation gain network has a transfer function $G_{vc1}(s)$ that is equal to the gain of the op-amp 5 times the impedance of the variable network divided by the impedance of the output resistor 210 plus the impedance of the designer variable network. From FIG. 9, this is described by Eq. 10.

$$G_{vc1}(s) = A \cdot \frac{Z(s)}{R_{OUT} + Z(s)} \text{ where} \quad \text{(Eq. 10)}$$

$$Z(s) = \frac{1+sR_1C_1}{s(C_1+C_2)\left(1+sR_1\frac{C_1C_2}{C_1+C_2}\right)}.$$

Therefore, the transfer function for the first part of the compensation gain network $G_{vc1}(s)$ can be expressed as Eq. 11.

$$G_{vc1}(s) = A \cdot \frac{1+sR_1C_1}{1+s(R_1C_1+R_{OUT}(C_1+C_2))+s^2R_1R_{OUT}C_1C_2} \quad \text{(Eq. 11)}$$

This transfer function introduces a low frequency zero and pole into the loop and also adds an additional pole to cancel out the zero caused by the output capacitor and ESR.

Using Eq. 11, the poles can be obtained by setting the denominator to a standard polynomial function where $$\frac{1}{2\pi f_1}$$

and $$\frac{1}{2\pi f_3}$$

are coefficients of s such that $f_1$ is the low frequency pole frequency and $f_3$ is the frequency of the pole to cancel the zero created by the output capacitor and ESR. This process is described by the following equations.

$$\left(1+\frac{s}{2\pi f_1}\right)\left(1+\frac{s}{2\pi f_3}\right) = \quad \text{(Eq. 12)}$$
$$1+s(R_1C_1+R_{OUT}(C_1C_2))+s^2R_1R_{OUT}C_1C_2$$

$$1+s\left(\frac{1}{2\pi f_1}+\frac{1}{2\pi f_3}\right)+\frac{s^2}{(2\pi)^2 f_1 f_3} = \quad \text{(Eq. 13)}$$
$$1+s(R_1C_1+R_{OUT}(C_1C_2))+s^2R_1R_{OUT}C_1C_2$$

By supposing $$2\pi f_1 \ll 2\pi f_3 \Rightarrow \left(\frac{1}{2\pi f_1}+\frac{1}{2\pi f_3}\right) \cong \frac{1}{2\pi f_1},$$

the coefficients can be equated as follows.

$$\frac{1}{2\pi f_1} = R_1C_1 + R_{OUT}(C_1+C_2) \quad \text{(Eq. 14)}$$

$$\frac{1}{(2\pi)^2 f_1 f_3} = R_1 R_{OUT} C_1 C_2 \quad \text{(Eq. 15)}$$

By supposing $R_1 \ll R_{OUT}$, Eq. 14 can be described by Eq. 16, which is then substituted into Eq. 15 to get Eq. 17.

$$\frac{1}{2\pi f_1} \cong R_{OUT}(C_1+C_2) \quad \text{(Eq. 16)}$$

$$\frac{1}{2\pi f_3} \cong R_1 \frac{C_1 C_2}{C_1+C_2} \quad \text{(Eq. 17)}$$

By further supposing that $C_2 \ll C_1$, Eqs. 16 and 17 are finally solved to be Eqs. 18 and 19 which give the frequency of the poles $f_1$ and $f_3$.

$$f_1 \cong \frac{1}{2\pi R_{OUT} C_1} \quad \text{(Eq. 18)}$$

$$f_3 \cong \frac{1}{2\pi R_1 C_2} \quad \text{(Eq. 19)}$$

Now, the pole $f_3$ can be equated to the zero created in each switching converter by the output capacitor and ESR as shown in Eqs. 3 through 6 so the pole $f_3$ will cancel the zero.

$$\frac{1}{R_1 C_2} = \frac{1}{R_{ESR} C_{OUT}} \quad \text{(Eq. 20)}$$

Thus, a circuit designer can use components that have a product that is equal to the product of the output capacitor and ESR to cancel the zero created by the output capacitor and ESR. Also, the designer would add the low frequency pole and zero necessary to compensate the loop that already had a fixed high frequency zero and pole. All of this is done with no circuitry on the feedback part of the loop and is done with only one pin on the controller package.

Though a goal of embodiments is to include all of the components that are shown on the package in FIG. 9 in a single package, the high frequency zero and pole filter and PWM do not have to be contained within a single package with the other components.

Figure 10:
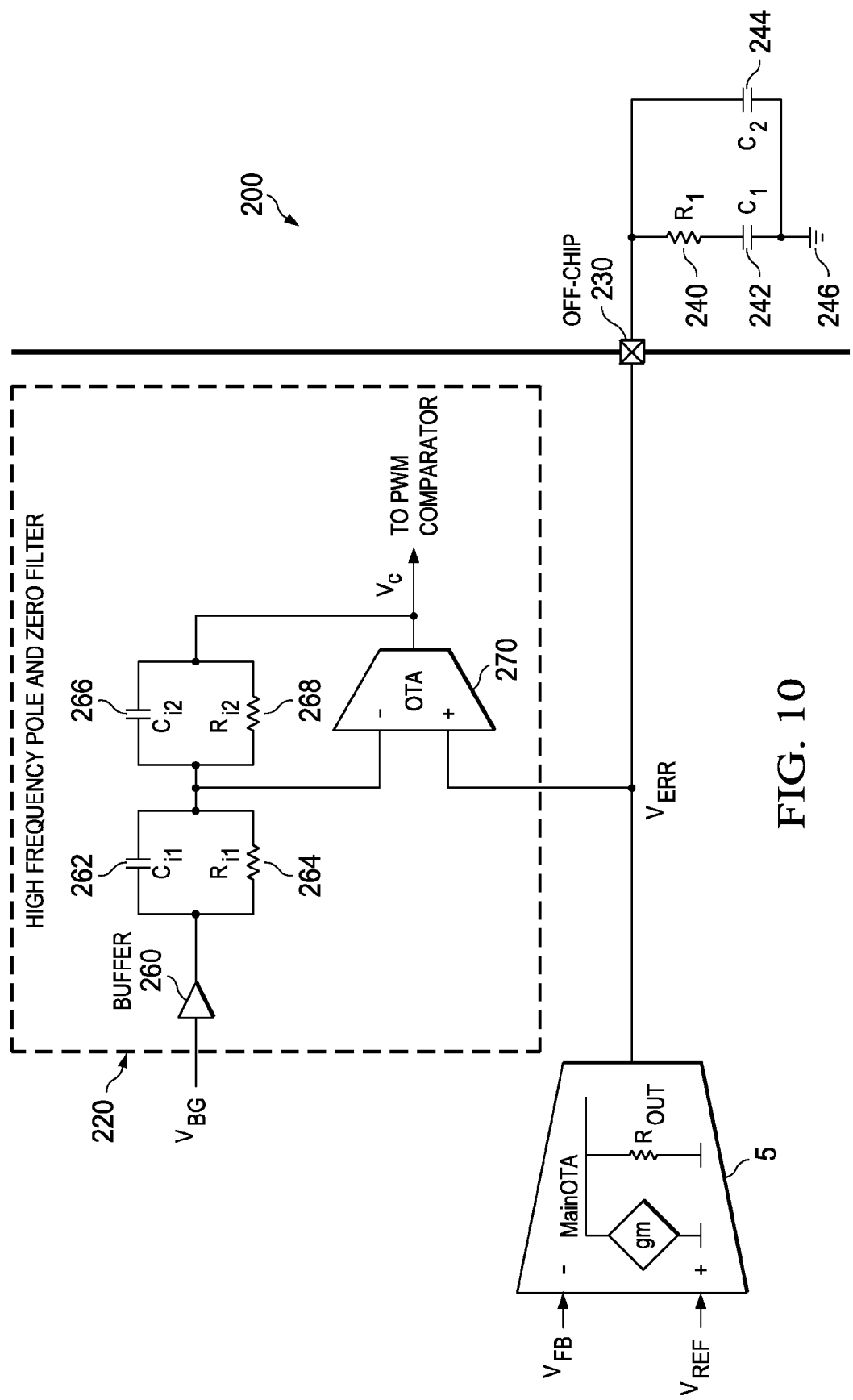
FIG. 10 is a first further embodiment to control a switching converter.
Figure 11:
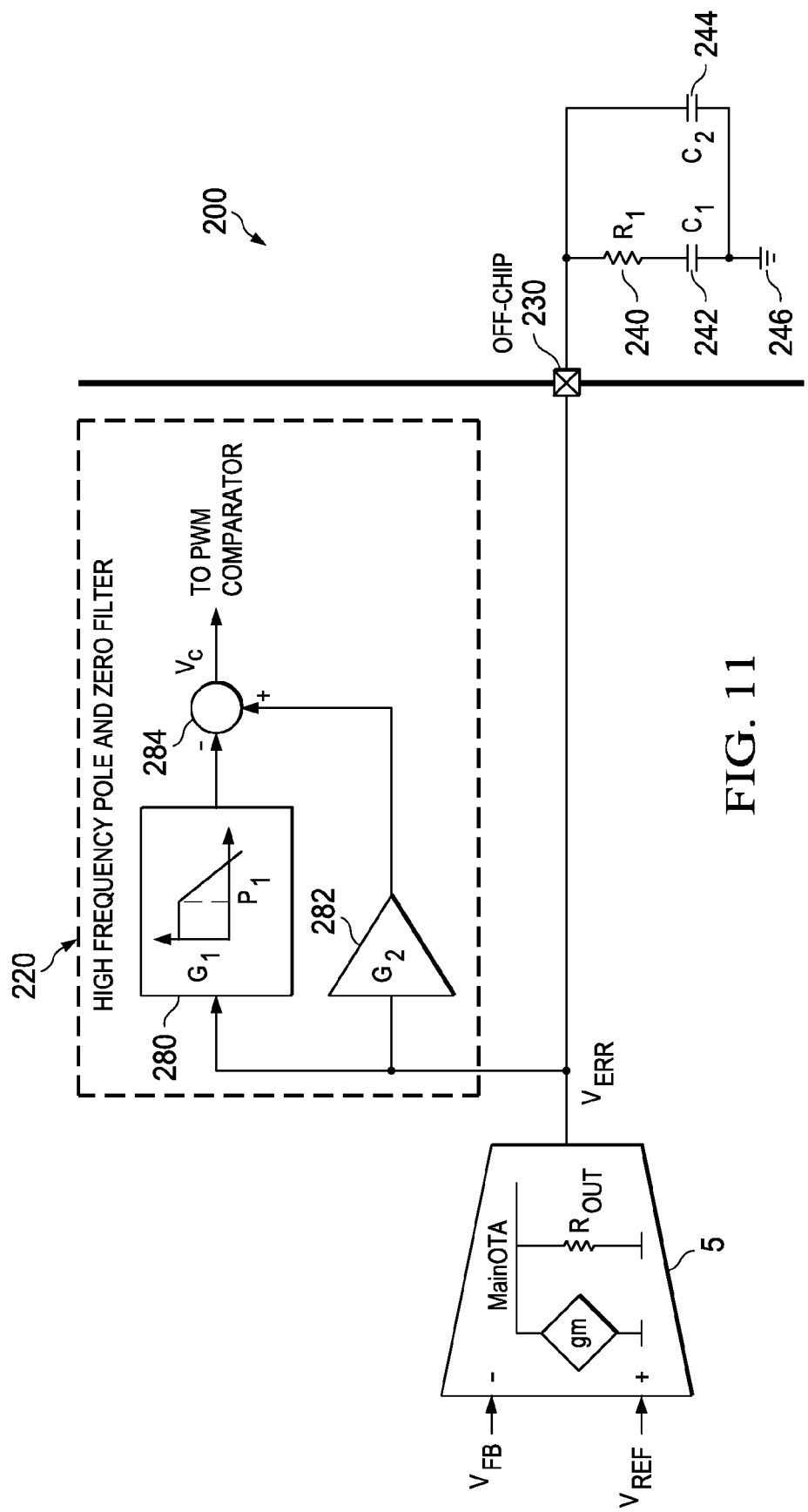
FIG. 11 is a second further embodiment to control a switching converter.

FIGS. 10 and 11 show further embodiments. In each of the embodiments in FIGS. 10 and 11, the low frequency pole and zero and the pole to cancel the zero caused by the output capacitor and ESR are set external to a package in the variable network as discussed above with regard to FIG. 9.

In FIG. 10, the fixed compensation filter 220 shows an analog filter with inputs of a voltage source $V_{BG}$ and the voltage $V_{ERR}$. The voltage $V_{ERR}$ is input to the non-inverting terminal of an op-amp 270. The voltage source $V_{BG}$ is input into a buffer 260 that has an output coupled to a parallel first internal capacitor 262 and a first internal resistor 264. The first internal capacitor 262 and a first internal resistor 264 are then connected to the inverting terminal of the op-amp 270 and to a parallel second internal capacitor 266 and a second internal resistor 268. The second internal capacitor 266 and a second internal resistor 268 are then connected to the output of the op-amp 270 which is the compensation voltage $V_c$ output to the PWM. This filter has a high frequency zero of $$\frac{R_{i1} + R_{i2}}{2\pi R_{i1} R_{i2} (C_{i1} + C_{i2})}$$

and a high frequency pole of $$\frac{1}{2\pi R_{i2} C_{i2}}.$$

In FIG. 11, the voltage $V_{ERR}$ is input into a gain block 282 and a low pass filter 280. The difference 284 of the low pass filter 280 output from the gain block 282 output is output as the compensation voltage $V_c$ to the PWM. This embodiment allows for the possibility to implement the filter digitally. This filter has a high frequency zero of $$p_1\left(1 - \frac{G_1}{G_2}\right)$$

and a high frequency pole of $p_1$.

The above discussion of the various embodiments has focused on the high frequency zero and pole being fixed internally to the package with the low frequency pole and zero being set externally, but any combination of poles and zeros may be fixed internally or externally. Specifically, the low frequency pole and high frequency zero can be set externally with the low frequency zero and high frequency pole being fixed internally. This allows a circuit designer to adjust the UGF by allowing the designer to choose the high frequency zero.

Although the present invention and its advantages have been described in detail, it should be understood that various changes, substitutions and alterations can be made herein without departing from the spirit and scope of the invention as defined by the appended claims. For example, any other switching converter may replace the converters described in the above embodiments. The principles relating to compensating the above described converters apply similarly to other types of converters, and the features and functions discussed above can be implemented similarly while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A switching converter comprising:
a switching converter power stage having an output voltage output;
an amplifier having a feedback input coupled to the output voltage, a reference input coupled to a reference voltage, and an error voltage output;
a first compensation network having a first node coupled to the error voltage and a second node coupled to electrical ground, wherein a first frequency domain transfer function of the first compensation network comprises a first zero and a plurality of first poles;
a second compensation network having an input coupled to the error voltage, wherein a second frequency domain transfer function of the second compensation network comprises a second zero and a second pole; and
a pulse-width modulator having an input coupled to an output of the second compensation network and having an output coupled to an input of the switching converter power stage.

2. The switching converter of claim 1, further comprising drive circuitry coupled between the pulse-width modulator and the switching converter power stage.

3. The switching converter of claim 1, further comprising a divider network coupled between the output voltage and the feedback input of the amplifier.

4. The switching converter of claim 1, wherein at least one of the plurality of first poles substantially equals a frequency of a zero created by the switching converter power stage.

5. The switching converter of claim 4, wherein the first zero and at least one of the plurality of first poles are a low frequency zero and a low frequency pole, respectively, and wherein the second zero and the second pole are a high frequency zero and a high frequency pole, respectively.

6. The switching converter of claim 4, wherein the first zero and at least one of the plurality of first poles are a low frequency zero and a high frequency pole, respectively, and wherein the second zero and the second pole are a high frequency zero and a low frequency pole, respectively.

7. The switching converter of claim 4, wherein the first zero and at least one of the plurality of first poles are a high frequency zero and a low frequency pole, respectively, and wherein the second zero and the second pole are a low frequency zero and a high frequency pole, respectively.

8. The switching converter of claim 4, wherein the first zero and at least one of the plurality of first poles are a high frequency zero and a high frequency pole, respectively, and wherein the second zero and the second pole are a low frequency zero and a low frequency pole, respectively.

9. A switching converter comprising:
a switching converter power stage having an output voltage output;
an amplifier having a feedback input coupled to the output voltage, a reference input coupled to a reference voltage, and an error voltage output;

a first compensation network having a first node coupled to the error voltage and a second node coupled to electrical ground, the first compensation network comprising a first resistor and a first capacitor coupled in series between the error voltage and the electrical ground and a second capacitor coupled between the error voltage and the electrical ground;

a second compensation network having an input coupled to the error voltage; and a pulse-width modulator having an input coupled to an output of the second compensation network and having an output coupled to an input of the switching converter power stage.

10. The switching converter of claim 9, further comprising drive circuitry coupled between the pulse-width modulator and the switching converter power stage.

11. The switching converter of claim 9, further comprising a divider network coupled between the output voltage and the feedback input of the amplifier.

12. The switching converter of claim 9, wherein a product of the first resistor multiplied by the second capacitor substantially equals a product of an output capacitor of the switching converter power stage multiplied by an equivalent series resistor of the switching converter power stage.

13. An integrated circuit package comprising:
a package body;
a plurality of external connections disposed on the package body;
an operational amplifier disposed within the package body, wherein the operational amplifier has a reference voltage input, a feedback voltage input, and an error voltage output, the error voltage output coupled to one of the external connections for external compensation of a switching converter between the one of the external connections and electrical ground, wherein the external compensation has a frequency domain transfer function that comprises a pole with a frequency that is substantially equal to a frequency of a zero caused by an output capacitor and equivalent series resistor of the switching converter; and
a fixed filter disposed within the package body, wherein the fixed filter has an input coupled to the error voltage output of the operational amplifier.

14. The integrated circuit package of claim 13, further comprising a pulse-width modulator disposed within the package body and having an input coupled to an output of the fixed filter.

15. The integrated circuit package of claim 14, further comprising a transistor switch of the switching converter disposed within the package body and having an input coupled to an output of the pulse-width modulator.

16. The integrated circuit package of claim 13, wherein the fixed filter has a frequency domain transfer function that comprises a high frequency zero and a high frequency pole.

17. The integrated circuit package of claim 13, wherein the fixed filter has a frequency domain transfer function that comprises a high frequency zero and a low frequency pole.

18. The integrated circuit package of claim 13, wherein the fixed filter has a frequency domain transfer function that comprises a low frequency zero and a high frequency pole.

19. The integrated circuit package of claim 13, wherein the fixed filter has a frequency domain transfer function that comprises a low frequency zero and a low frequency pole.

20. A method for controlling a switching converter, the method comprising:
comparing a feedback voltage from a switching converter power stage to a reference voltage to generate an error signal;
filtering the error signal with a compensation network coupled between the error signal and an electrical ground, wherein a frequency domain transfer function of the compensation network comprises a first zero and a plurality of first poles;
filtering the error signal with a fixed filter to generate a compensation voltage output, wherein a frequency domain transfer function of the fixed filter comprises a second zero and a second pole;
driving an input of the switching converter power stage using the compensation voltage; and
outputting a converter output voltage from the switching converter power stage.

21. The method of claim 20, wherein the driving further comprises pulse-width modulating the compensation voltage prior to the input of the switching converter power stage.

22. The method of claim 20, wherein the feedback voltage is a fixed ratio of the converter output voltage.

23. The method of claim 20, wherein at least one of the plurality of first poles substantially equals a zero of a frequency domain transfer function of the switching converter power stage.

24. The method of claim 20, wherein the first zero is a low frequency zero, at least one of the plurality of first poles is a low frequency pole, the second zero is a high frequency zero, and the second pole is a high frequency pole.

25. The method of claim 20, wherein the first zero is a low frequency zero, at least one of the plurality of first poles is a high frequency pole, the second zero is a high frequency zero, and the second pole is a low frequency pole.

26. The method of claim 20, wherein the first zero is a high frequency zero, at least one of the plurality of first poles is a low frequency pole, the second zero is a low frequency zero, and the second pole is a high frequency pole.

27. The method of claim 20, wherein the first zero is a high frequency zero, at least one of the plurality of first poles is a high frequency pole, the second zero is a low frequency zero, and the second pole is a low frequency pole.

* * * * *